United States Patent
Ohki

(10) Patent No.: US 8,425,690 B2
(45) Date of Patent: Apr. 23, 2013

(54) BEARING PART, HEAT TREATMENT METHOD THEREOF, AND ROLLING BEARING

(75) Inventor: Chikara Ohki, Kuwana (JP)

(73) Assignee: NTN Corporation, Osaka-shi (JP)

( * ) Notice: Subject to any disclaimer, the term of this patent is extended or adjusted under 35 U.S.C. 154(b) by 671 days.

(21) Appl. No.: 11/118,385

(22) Filed: May 2, 2005

(65) Prior Publication Data

US 2005/0205163 A1    Sep. 22, 2005

Related U.S. Application Data

(62) Division of application No. 10/300,590, filed on Nov. 21, 2002, now Pat. No. 7,438,477.

(30) Foreign Application Priority Data

| Nov. 29, 2001 | (JP) | 2001-364516 |
| Jul. 3, 2002 | (JP) | 2002-194775 |
| Jul. 3, 2002 | (JP) | 2002-194793 |
| Jul. 3, 2002 | (JP) | 2002-194804 |
| Jul. 3, 2002 | (JP) | 2002-194921 |

(51) Int. Cl.
    *C23C 8/32*    (2006.01)
(52) U.S. Cl.
    USPC .......................................... 148/219; 148/318
(58) Field of Classification Search .................. 148/219, 148/318
    See application file for complete search history.

(56) References Cited

U.S. PATENT DOCUMENTS

| 3,954,517 | A | | 5/1976 | Jatczak et al. |
| 4,162,419 | A | | 7/1979 | DeAngelis |
| 4,930,909 | A | * | 6/1990 | Murakami et al. ............ 384/492 |
| 4,971,634 | A | | 11/1990 | Shibata et al. |
| 5,085,733 | A | | 2/1992 | Mitamura |
| 5,129,966 | A | | 7/1992 | Rao |
| 5,137,375 | A | | 8/1992 | Murakami et al. |
| 5,180,450 | A | | 1/1993 | Rao |
| 5,338,377 | A | * | 8/1994 | Mitamura et al. ............ 148/318 |
| 5,352,303 | A | | 10/1994 | Murakami et al. |
| 5,375,323 | A | | 12/1994 | Sata |
| 5,413,643 | A | | 5/1995 | Murakami et al. |

(Continued)

FOREIGN PATENT DOCUMENTS

| CN | 1344932 A | 4/2002 |
| CN | 1351694 A | 5/2002 |

(Continued)

OTHER PUBLICATIONS

JIS G 0551 "Methods of austenite grain size determination for steel", Published by Japanese Standards Association, Feb. 20, 1998.

(Continued)

*Primary Examiner* — Jessee R. Roe
(74) *Attorney, Agent, or Firm* — McDermott Will & Emery LLP

(57) ABSTRACT

A bearing part comprising steel subjected to carbonitriding at a carbonitriding temperature exceeding the $A_1$ transformation temperature, and cooled to a temperature lower than the $A_1$ transformation temperature. The steel is reheated to a temperature for quenching that is not lower than the $A_1$ transformation temperature but lower than the carbonitriding temperature, and then quenched.

5 Claims, 7 Drawing Sheets

U.S. PATENT DOCUMENTS

| | | |
|---|---|---|
| 5,427,457 A | 6/1995 | Furumura et al. |
| 5,427,600 A | 6/1995 | Itoh et al. |
| 5,456,136 A | 10/1995 | Yamashita et al. |
| 5,456,766 A | 10/1995 | Beswick et al. |
| 5,556,348 A | 9/1996 | Kokubu et al. |
| 5,595,610 A | 1/1997 | Maeda et al. |
| 5,611,250 A | 3/1997 | Narai et al. |
| 5,658,082 A | 8/1997 | Tsushima et al. |
| 5,735,769 A | 4/1998 | Takemura et al. |
| 5,772,956 A | 6/1998 | Hasegawa et al. |
| 5,775,280 A | 7/1998 | Schmidt et al. |
| 5,803,993 A | 9/1998 | Takemura et al. |
| 5,848,846 A | 12/1998 | Sugiyama et al. |
| 5,853,249 A | 12/1998 | Maeda et al. |
| 5,944,916 A | 8/1999 | Chung |
| 5,972,130 A | 10/1999 | Underys et al. |
| 5,979,383 A | 11/1999 | Faville et al. |
| 6,012,851 A | 1/2000 | Hirakawa et al. |
| 6,086,686 A | 7/2000 | Tanaka et al. |
| 6,095,692 A | 8/2000 | Takemura |
| 6,149,734 A | 11/2000 | Isogai et al. |
| 6,158,263 A | 12/2000 | Maeda et al. |
| 6,165,289 A | 12/2000 | Matsumoto et al. |
| 6,224,688 B1 | 5/2001 | Takemura et al. |
| 6,251,198 B1 | 6/2001 | Koo et al. |
| 6,258,179 B1 | 7/2001 | Takayama et al. |
| 6,290,398 B1 | 9/2001 | Fujiwara et al. |
| 6,306,227 B2 | 10/2001 | Okayama et al. |
| 6,309,475 B1 | 10/2001 | Takayama et al. |
| 6,328,009 B1 | 12/2001 | Brothers |
| 6,342,109 B1 | 1/2002 | Takemura et al. |
| 6,423,158 B1 | 7/2002 | Maeda et al. |
| 6,440,232 B1 | 8/2002 | Takemura et al. |
| 6,447,619 B1 | 9/2002 | Takayama et al. |
| 6,488,789 B2 | 12/2002 | Tajima et al. |
| 6,532,920 B1 | 3/2003 | Sweetnam et al. |
| 6,582,532 B1 | 6/2003 | Kurebayashi et al. |
| 6,602,358 B1 | 8/2003 | Ochi et al. |
| 6,641,680 B2 | 11/2003 | Nishimori et al. |
| 6,699,335 B2 | 3/2004 | Murakami et al. |
| 6,855,217 B2 | 2/2005 | Suzuki |
| 7,147,382 B2 | 12/2006 | Suzuki et al. |
| 7,334,943 B2 | 2/2008 | Okugami et al. |
| 7,438,477 B2 | 10/2008 | Ohki |
| 7,585,114 B2 | 9/2009 | Ohki et al. |
| 7,682,087 B2 | 3/2010 | Okugami et al. |
| 2002/0043111 A1 | 4/2002 | Takagi et al. |
| 2002/0082133 A1 | 6/2002 | Yoshikawa et al. |
| 2002/0088511 A1 | 7/2002 | Nakamura et al. |
| 2002/0159905 A1 | 10/2002 | Bachmann et al. |
| 2003/0040401 A1 | 2/2003 | Okita et al. |
| 2003/0063829 A1 | 4/2003 | Tamada et al. |
| 2003/0075244 A1 | 4/2003 | Kurebayashi et al. |
| 2003/0123769 A1 | 7/2003 | Ohki |
| 2004/0079310 A1 | 4/2004 | Suzuki et al. |
| 2004/0170348 A1 | 9/2004 | Okugami et al. |
| 2004/0179761 A1 | 9/2004 | Ohki et al. |
| 2004/0228561 A1 | 11/2004 | Okugami et al. |
| 2005/0045247 A1 | 3/2005 | Ohki |
| 2005/0109308 A1 | 5/2005 | Suzuki et al. |
| 2007/0034301 A1 | 2/2007 | Hasegawa et al. |
| 2007/0151633 A1 | 7/2007 | Ohki et al. |
| 2007/0169850 A1 | 7/2007 | Ohki et al. |

FOREIGN PATENT DOCUMENTS

| | | | |
|---|---|---|---|
| CN | 1421541 A | | 6/2003 |
| DE | 4204982 | | 8/1993 |
| DE | 4204982 A1 | | 8/1993 |
| DE | 19960803 A1 | | 6/2000 |
| DE | 10254635 A1 | | 6/2003 |
| EP | 0458646 | | 11/1991 |
| EP | 0 600 421 A1 | | 6/1994 |
| EP | 0600421 A1 | | 6/1994 |
| EP | 0626468 | | 11/1994 |
| EP | 0723034 | | 7/1996 |
| EP | 0 811 789 A1 | | 12/1997 |
| EP | 0 950 723 A1 | | 10/1999 |
| EP | 1 070 760 A2 | | 1/2001 |
| EP | 1070760 | | 1/2001 |
| EP | 1158064 | | 11/2001 |
| EP | 1184657 A2 | | 3/2002 |
| EP | 1273672 | | 1/2003 |
| EP | 1 411 142 A1 | | 4/2004 |
| FR | 2 841 907 | | 1/2004 |
| GB | 2 258 274 | | 2/1993 |
| GB | 2258274 | | 2/1993 |
| JP | 48-28308 | | 4/1973 |
| JP | 63-185917 | | 11/1988 |
| JP | 02-125841 A | | 5/1990 |
| JP | 2-190615 | | 7/1990 |
| JP | 03-116706 | | 12/1991 |
| JP | 4-254574 | | 9/1992 |
| JP | 5-9584 | | 1/1993 |
| JP | 05-118336 | | 5/1993 |
| JP | 5-163563 | | 6/1993 |
| JP | 05-179350 | | 7/1993 |
| JP | 5-263091 | | 10/1993 |
| JP | 6-101424 | | 4/1994 |
| JP | 06-117438 A | | 4/1994 |
| JP | 6-247253 | | 9/1994 |
| JP | 6-286577 | | 10/1994 |
| JP | 06-341441 | | 12/1994 |
| JP | 07-027139 A | | 1/1995 |
| JP | 8-4774 | | 1/1996 |
| JP | 8-49057 | | 2/1996 |
| JP | 08-233070 | | 9/1996 |
| JP | 08-311603 | | 11/1996 |
| JP | 09-053148 A | | 2/1997 |
| JP | 9-176740 A | | 7/1997 |
| JP | 9-316601 | | 12/1997 |
| JP | 9-329139 | | 12/1997 |
| JP | 10-030150 | | 2/1998 |
| JP | 10-047334 | | 2/1998 |
| JP | 10-68419 | | 3/1998 |
| JP | 10-103339 | | 4/1998 |
| JP | 10-110720 | | 4/1998 |
| JP | 10-168515 A | | 6/1998 |
| JP | 10-184701 A | | 7/1998 |
| JP | 10-204612 | | 8/1998 |
| JP | 10-204612 A | | 8/1998 |
| JP | 10-231908 | | 9/1998 |
| JP | 11-80897 | | 3/1999 |
| JP | 11-080897 | | 3/1999 |
| JP | 11-101247 | | 4/1999 |
| JP | 11-140543 A | | 5/1999 |
| JP | 11-222627 | | 8/1999 |
| JP | 11-303874 | | 11/1999 |
| JP | 2000-018255 | | 1/2000 |
| JP | 2000-38906 | | 2/2000 |
| JP | 2000-038907 | | 2/2000 |
| JP | 2000-54810 | | 2/2000 |
| JP | 2000-129347 A | | 5/2000 |
| JP | 2000-205284 | | 7/2000 |
| JP | 2000-212721 A | | 8/2000 |
| JP | 2001-123244 | | 5/2001 |
| JP | 2001-200314 A | | 7/2001 |
| JP | 2002-031212 | | 1/2002 |
| JP | 2002-070872 | | 3/2002 |
| JP | 2002-120508 | | 4/2002 |
| JP | 2002-180203 A | | 6/2002 |
| JP | 2002-194438 | | 7/2002 |
| JP | 2002-256336 | | 9/2002 |
| JP | 2002-339054 | | 11/2002 |
| JP | 2003-083337 | | 3/2003 |
| JP | 2003-083339 | | 3/2003 |
| JP | 2003-156050 | | 5/2003 |
| JP | 2003-226918 | | 8/2003 |
| JP | 2003-226919 | | 8/2003 |
| JP | 2003-287035 | | 10/2003 |
| JP | 2003-294034 | | 10/2003 |
| WO | WO 91/00929 | | 1/1991 |
| WO | WO 9100929 | | 1/1991 |
| WO | WO 02/40730 A1 | | 5/2002 |

OTHER PUBLICATIONS

JIS Z 2242 "Method of Impact test for metallic materials", Published by Japanese Standards Association, Dec. 21, 1998.

JIS Z 2202 "Test pieces for Impact test for metallic materials" Published by Japanese Standards Association, Feb. 20, 1998.

Kim et al., Influence of Subzero and Shot peening Treatments on Impact and Fatigue Fracture Properties of Case Hardened Steels, J. Heat Treat., v2, n1, p. 43-53. Jun. 1981 (Abstract).

Japanese Office Action for Corresponding Japanese Patent Application No. 2002-194775, dispatched Mar. 22, 2006.

Japanese Office Action for Corresponding Japanese Patent Application No. 2002-194793, dispatched Mar. 22, 2006.

Japanese Office Action for Corresponding Japanese Patent Application No. JP 2002-303036, dispatched on Apr. 25, 2006.

Japanese Office Action issued in corresponding Japanese Patent Application No. JP 2002-194921, dated Nov. 28, 2006.

Japanese Office Action issued in corresponding Japanese Patent Application No. JP 2002-194804, dated Nov. 28, 2006.

Japanese Office Action issued in corresponding Japanese Patent Application No. JP 2002-303036, dated Oct. 24, 2006.

Japanese Office Action Issued in corresponding Japanese Patent Application No. 2003-209737 dated Feb. 6, 2007.

Japanese Office Action with English translation issued in corresponding Japanese Patent Application No. JP 2002-194804, mailed Mar. 20, 2007.

French Search Report Issued in French Patent Application No. FR 0306034, dated on Feb. 21, 2005.

US Office Action issued in U.S. Appl. No. 10/300,590, dated on Apr. 18, 2007.

Burrier Jr., H., "Hardenability of Carbon and Low-Alloy Steels", 2002, ASM International.

Japanese Office Action, with English translation, issued in Japanese Patent Application No. JP 2002-194804, mailed Mar. 20, 2007.

Annual Book of ASTM Standards, 2003, vol. 03.01.

Chinese Office Action, with English translation, issued in Chinese Patent Application No. CN 200410008248.9, mailed Apr. 27, 2007.

U.S. Office Action, issued in U.S. Appl. No. 11/686,766, dated on Nov. 7, 2007.

U.S. Office Action, issued in U.S. Appl. No. 10/787,221, dated on Oct. 26, 2007.

Japanese Office Action, with English translation, issued in Japanese Patent Application No. JP 2004-053995 dated on Jun. 17, 2008.

Chinese Office Action, with English translation, issued in Chinese Patent Application No. CN 200610004620.8, mailed Sep. 5, 2008.

"Technical Means for Improvement of Service Life of a Rolling Bearing", Bearing, 2001, pp. 1,2,5 and 45, No. 5, and partial English translation.

Metallic Material Refining Technology, May 1995, p. 47, and partial English translation.

Chinese Office Action, with English translation, issued in Chinese Patent Application No. CN 200710146996.7, mailed Feb. 6, 2009.

European Search Report issued in European Patent Application No. EP 04807374.6 dated Dec. 18, 2008.

U.S. Office Action issued in U.S. Appl. No. 10/585,646 dated Jan. 16, 2009.

Chinese Office Action, w/ English translation thereof, issued in Chinese Patent Application No. CN 200710146997.1 dated Dec. 26, 2008.

United States Office Action issued in U.S. Appl. No. 10/787,221 dated Jul. 9, 2009.

United States Office Action issued in U.S. Appl. No. 10/795,389 dated Jul. 29, 2009.

United States Office Action issued in U.S. Appl. No. 11/501,816 dated Aug. 11, 2009.

United States Office Action issued in U.S. Appl. No. 10/897,016 dated May 27, 2009.

Japanese Notice of Grounds of Rejection, w/ English translation thereof, issued in Japanese Patent Application No. JP 2006-139254 dated May 26, 2009.

Japanese Office Action, with English translation, issued in Japanese Patent Application No. 2004-024096, mailed Jan. 19, 2010.

United States Office Action, issued in U.S. Appl. No. 12/785,288, dated Oct. 24, 2011.

* cited by examiner 0.05mm 0.05mm

BEARING PART, HEAT TREATMENT METHOD THEREOF, AND ROLLING BEARING

RELATED APPLICATION

This application is a divisional of application Ser. No. 10/300,590, now U.S. Pat. No. 7,438,477, filed on Nov. 21, 2002.

BACKGROUND OF THE INVENTION

1. Field of the Invention

The present invention relates to rolling bearings for use in compressors of automobiles and others, bearing parts used therein, and heat treatment methods thereof.

2. Description of the Background Art

In one heat treatment method, as a way of ensuring long life of a bearing part against rolling contact fatigue, a surface layer portion of the bearing part is subjected to carbonitriding, with ammonia gas, for example, added to the atmospheric RX gas for heating (disclosed, e.g., in Japanese Patent Laying-Open Nos. 8-4774 and 11-101247). This carbonitriding hardens the surface layer portion, and further generates residual austenite within the microstructure, thereby improving the rolling contact fatigue life.

However, since the carbonitriding involves diffusion, the bearing part needs to be held at high temperature for a long period of time, which may coarsen the microstructure, making it difficult to improve the anti-crack strength. Further, there is another problem of an increase of aged dimensional change due to the increased residual austenite.

It may be possible to use alloy steel to ensure a long rolling contact fatigue life, improve the anti-crack strength and prevent the increase of the dimensional change. However, using the alloy steel will increase the raw material cost.

As the environment of use of the bearings has become increasingly severe, future bearing parts will have to be used under the conditions of greater load and higher temperature than in the conventional case. To this end, a bearing part having long life against rolling contact fatigue, great anti-crack strength and excellent dimensional stability is required.

SUMMARY OF THE INVENTION

An object of the present invention is to provide a bearing part having long life against rolling contact fatigue, excellent in anti-crack strength and restricted in an increase of aged dimensional change, a heat treatment method thereof, and a rolling bearing including the bearing part.

A heat treatment method of a bearing part according to the present invention includes the steps of carbonitriding steel for the bearing part at a carbonitriding temperature exceeding the $A_1$ transformation temperature, cooling the steel to a temperature lower than the $A_1$ transformation temperature, reheating the steel to a temperature for quenching that is not lower than the $A_1$ transformation temperature but lower than the carbonitriding temperature, and quenching the steel.

With this configuration, the final quenching is conducted after the steel is cooled to a temperature lower than the $A_1$ transformation temperature following the carbonitriding, so that the austenite grain size can be made fine. As a result, it is possible to improve the Charpy impact, fracture toughness, anti-crack strength, rolling contact fatigue life and others.

In addition, by cooling the steel to a temperature allowing the austenite to transform, it is possible to make the austenite grain boundaries at the time of carbonitriding and the austenite grain boundaries at the time of final quenching irrelevant to each other. Further, since the heating temperature for the final quenching is lower than that of the carbonitriding, the amounts of undissolved carbide and nitride in the surface layer portion affected by the carbonitriding increase in the final quenching than in the carbonitriding. As such, at the heating temperature for the final quenching, the ratio of the amounts of undissolved carbide and others increases and the ratio of the amount of austenite decreases as compared with those at the time of carbonitriding. Further, from the carbon-iron phase diagram (which is applicable with an approximate high precision, although the steel as the object of the present invention also includes elements other than carbon), in the co-existing region of the above precipitates and the austenite, the concentration of carbon dissolved in the austenite decreases as a decrease of the temperature for quenching.

When the steel is heated to the temperature for final quenching, the amount of undissolved cementite suppressing growth of the austenite grains becomes large, so that fine austenite grains are obtained. In addition, since the structure transformed from the austenite to martensite or bainite by the quenching has lower carbon concentration, it exhibits excellent toughness compared to the structure quenched from the high, carbonitriding temperature.

The steel for a bearing part herein refers to steel commonly used to form a bearing part, which is subjected to heat treatment such as ordinary quenching.

In the heat treatment method of a bearing part according to the present invention, the reheating temperature for quenching may be in a temperature range from 790° C. to 830° C.

With this configuration, the steel is reheated for quenching to the temperature suppressing growth of the austenite grains, so that the austenite grain size can be made small.

A bearing part according to the present invention is subjected to the heat treatment method for a bearing part as described above, and the austenite grains may have a mean grain size of not greater than 8 μm.

With the austenite grains having the mean grain size of not greater than 8 μm, it is possible to improve, not only the rolling contact fatigue life, but also the Charpy impact, fracture toughness, collapse strength and others.

A bearing part according to the present invention is formed of steel for a bearing part, and has a carbonitrided layer. The microstructure obtained after quenching has austenite grains of a mean grain size of not greater than 8 μm.

With this configuration, it is possible to ensure excellent Charpy impact, fracture toughness, collapse strength and others, while securing long life against rolling contact fatigue.

The steel for the bearing part of the present invention may at least include, in a portion other than a carbonitrided surface layer, 0.6-1.2 wt. % of carbon, 0.15-1.1 wt. % of silicon, and 0.3-1.5 wt. % of manganese.

In this configuration, if the carbon content exceeds 1.2 wt. %, cold workability would be impaired, with the material hardness being high even after spheroidizing annealing. If cold work is performed, it would be impossible to obtain a sufficient cold work amount, and thus, a desired machining precision would not be expected. It would also result in excess carburizing at the time of carbonitriding, probably degrading the anti-crack strength. On the other hand, if the carbon content is less than 0.6 wt. %, a long period of time would be needed to ensure a required surface hardness and a required amount of residual austenite, and it would be difficult to obtain necessary internal hardness after the final quenching.

Si is contained as it increases resistance to temper softening and ensures heat resistance, and also improves the rolling contact fatigue property under a foreign matter mixed lubricating condition. If the silicon content is less than 0.15 wt. %, the rolling contact fatigue property under the foreign matter mixed lubricating condition would not improve. If it exceeds 1.1 wt. %, the hardness after normalizing would become too high, impairing the cold workability.

Mn effectively ensures hardenability of the carbonitrided layer and the core portion. If the Mn content is less than 0.3 wt. %, the hardenability would not be obtained sufficiently, and thus, sufficient strength of the core portion would not be expected. On the other hand, if the Mn content exceeds 1.5 wt. %, the hardenability would become too strong. In such a case, the hardness after normalizing would become too high, impairing the cold workability. In addition, the austenite would be stabilized too much, leading to an excessive amount of residual austenite in the core portion, thereby accelerating aged dimensional change.

Needless to say, the steel of the present invention has Fe as its main component. It also includes unavoidable impurities such as phosphorus (P), sulfur (S), nitrogen (N), oxygen (O), aluminum (Al) and others, each in the amount of not greater than 0.1 wt. %.

The steel of the present invention may further include chromium of not greater than 2.0 wt. %.

Inclusion of chromium of not greater than 2.0 wt. % will result in precipitation of carbide and nitride of chromium in the surface layer portion, thereby improving the hardness of the relevant portion. If the Cr content exceeds 2.0 wt. %, the cold workability would be degraded considerably. The effect of improving the hardness of the surface layer portion would not change largely even if the content exceeds 2.0 wt. %.

The bearing part of the present invention may be at least one of rolling bearing ring and rolling element of a rolling bearing.

With this configuration, it is possible to obtain the rolling bearing ring and/or rolling element excellent in rolling contact fatigue life and anti-crack property.

A rolling bearing according to the present invention may include any of the bearing parts as described above.

With this configuration, it is possible to obtain a rolling bearing excellent in durability against rolling contact fatigue and having great anti-crack strength.

A rolling bearing according to the present invention has an inner ring, an outer ring and a plurality of rolling elements. With this rolling bearing, at least one member of the inner ring, outer ring and rolling elements has a carbonitrided layer, and the member has austenite grains of a grain size exceeding a JIS grain size number 10.

The rolling contact fatigue life can be improved remarkably with such fine austenite grains. If the austenite grains have a grain size of No. 10 or less, the rolling contact fatigue life would not improve largely. Thus, the grain size of No. 11 or greater is normally preferred. Although the finer austenite grains are more preferable, it is generally difficult to obtain the grain size exceeding No. 13. The austenite grains of the bearing part described above have approximately the same sizes in the surface layer portion suffering a large influence of the carbonitriding and in the portion inner than the same. Thus, the austenite grains having a grain size number in the range described above are required for both the surface layer portion and the inner portion.

Any member among the inner ring, outer ring and rolling elements of the above-described rolling bearing may consist of the bearing part as described above, and the rolling contact fatigue life thereof will improve if the bearing part has austenite grains of a grain size number in the aforementioned range.

A rolling bearing according to the present invention has an inner ring, an outer ring and a plurality of rolling elements, and at least one member of the inner ring, outer ring and rolling elements includes steel having a carbonitrided layer and has fracture stress of not lower than 2650 MPa.

The inventors have found that the fracture stress of steel having a carbonitrided layer can be made equal to or greater than 2650 MPa, a level having been impossible to reach with the conventional techniques, by carbonitriding the steel at a temperature exceeding the $A_1$ transformation temperature, cooling the steel to a temperature lower than the $A_1$ transformation temperature, reheating the steel to a temperature not lower than the $A_1$ transformation temperature, and quenching the steel. By doing so, it is possible to obtain a rolling bearing superior in fracture stress, and hence superior in strength to the conventional one.

Further, a bearing part according to the present invention is incorporated into a rolling bearing. The bearing part includes steel having a carbonitrided layer and has fracture stress of not lower than 2650 MPa.

As such, as in the case of the rolling bearing as described above, it is possible to obtain a bearing part that is superior in fracture stress and hence superior in anti-crack strength to the conventional one.

A rolling bearing according to the present invention has an inner ring, an outer ring, and a plurality of rolling elements. In the rolling bearing, at least one member of the inner ring, outer ring and rolling elements has a carbonitrided layer, and the member has hydrogen content of not greater than 0.5 ppm.

With this configuration, it is possible to alleviate embrittlement of the steel attributable to hydrogen. If the hydrogen content exceeds 0.5 ppm, the anti-crack strength would be degraded, hindering use of the rolling bearing in a site on which severe load would be applied. The smaller hydrogen content is more preferable. However, in order to reduce the hydrogen content to a level lower than 0.3 ppm, heating for a long period of time will be necessary, which will coarsen the austenite grains, thereby degrading the toughness. Thus, the hydrogen content in the range of 0.3-0.5 ppm is more preferable, and the content in the range of 0.35-0.45 ppm is still more preferable.

The hydrogen content as described above is obtained by measuring only the amount of non-diffusible hydrogen discharged from the steel at a temperature not lower than a prescribed temperature. The content of diffusible hydrogen is unmeasured because, if a sample size is small, it would be discharged from the sample and lost even at a room temperature. The non-diffusible hydrogen is trapped, e.g., in a defect portion within the steel, and is discharged from the sample only at a temperature not lower than the prescribed temperature. Even if the measurement is limited to the non-diffusible hydrogen, the hydrogen content would vary considerably depending on measuring methods. The hydrogen content in the range as described above is measured utilizing thermal conductivity, preferably by Leco's DH-103 hydrogen analyzer or equivalent instrument, as will be described later.

The austenite grains of the member described above preferably have a grain size exceeding JIS grain size number 10.

The rolling contact fatigue life improves remarkably when the austenite grains are fine. If the grain size number of the austenite grains is No. 10 or less, the rolling contact fatigue life at a high temperature would not improve largely. Although the smaller austenite grain size is more preferable, it is generally difficult to obtain the grain size exceeding No. 13. The austenite grains of the bearing part described above have almost the same grain sizes in the surface layer portion suffering a large influence of the carbonitriding and in the portion inner than the same.

Any member of the inner ring, outer ring and rolling elements of the above-described rolling bearing may be the bearing part as described above. If the bearing part has the hydrogen content in the range as described above, the anti-crack strength thereof will improve. Further, if the grain size number of the austenite grains thereof falls in the range as described above, the rolling contact fatigue life will also improve.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
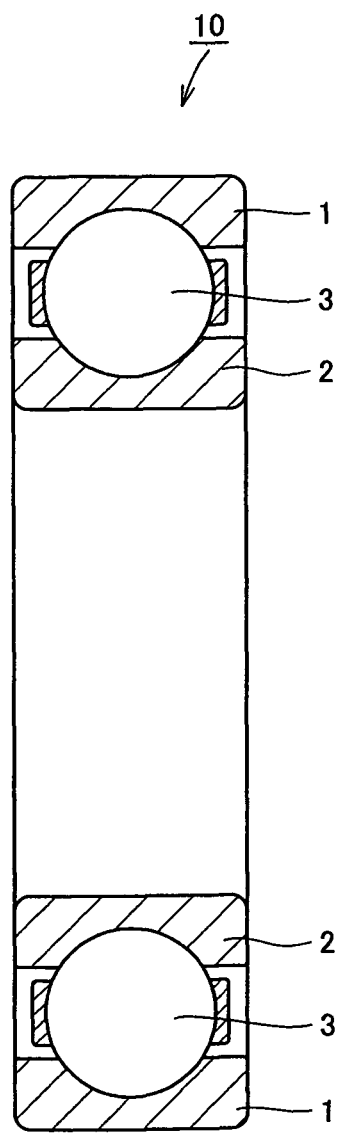
FIG. 1 is a schematic cross sectional view of a rolling bearing according to an embodiment of the present invention.

Hereinafter, embodiments of the present invention will be described with reference to the drawings. FIG. 1 is a schematic cross sectional view of the rolling bearing according to an embodiment of the present invention. Referring to FIG. 1, the rolling bearing 10 includes, among others, an outer ring 1, an inner ring 2, and rolling elements 3. Although a radial bearing is shown, the present invention is also applicable to ball bearing, tapered roller bearing, roller bearing, and needle roller bearing. Rolling elements 3 are supported in a rollable manner by a cage arranged between outer ring 1 and inner ring 2.

At least one member of outer ring 1, inner ring 2 and rolling elements 3 is formed of a steel material having a carbonitrided layer. The austenite grains of the steel material have a mean grain size of not greater than 8 μm.

At least one member of outer ring 1, inner ring 2 and rolling elements 3 is formed of a steel material having a carbonitrided layer, which includes, in a portion other than the surface layer thereof, 0.6-1.2 wt. % of carbon, 0.15-1.1 wt. % of silicon, and 0.3-1.5 wt. % of manganese. In a prescribed case, it further includes 2 wt. % or less of chromium.

At least one member of outer ring 1, inner ring 2 and rolling elements 3 is formed of a steel material having a carbonitrided layer and exhibits fracture stress of not less than 2650 MPa.

Further, at least one member of outer ring 1, inner ring 2 and rolling elements 3 is formed of a steel material having a carbonitrided layer, and hydrogen content of the steel is not greater than 0.5 ppm.

At least one member of outer ring 1, inner ring 2 and rolling elements 3 is formed of a steel material having a carbonitrided layer, and the austenite grains of the member have a grain size exceeding JIS grain size number 10.

Still further, at least one member of outer ring 1, inner ring 2 and rolling elements 3 is formed of a steel material having a carbonitrided layer and exhibits Charpy impact of not less than 6.2 $J/Cm^2$.

Figure 2:
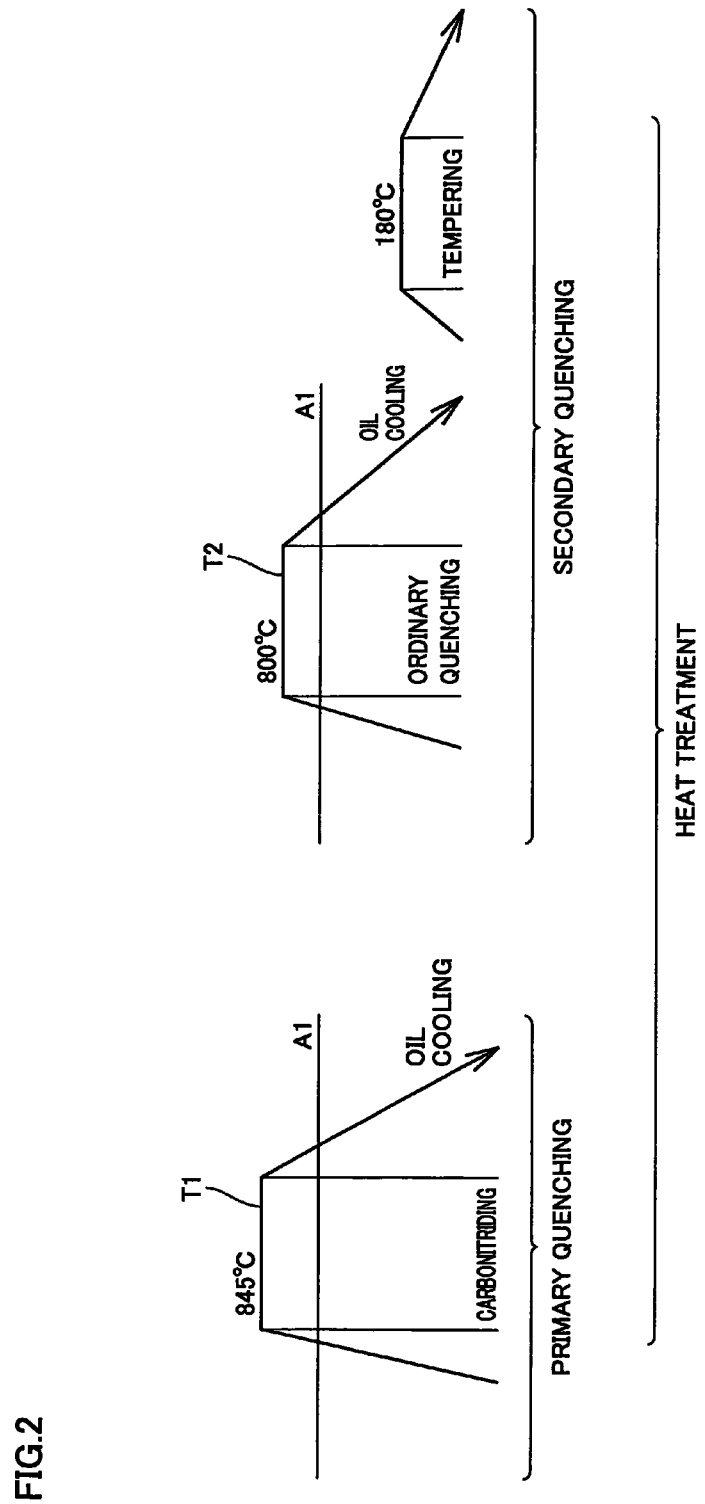
FIG. 2 illustrates a heat treatment method according to an embodiment of the present invention.
Figure 3:
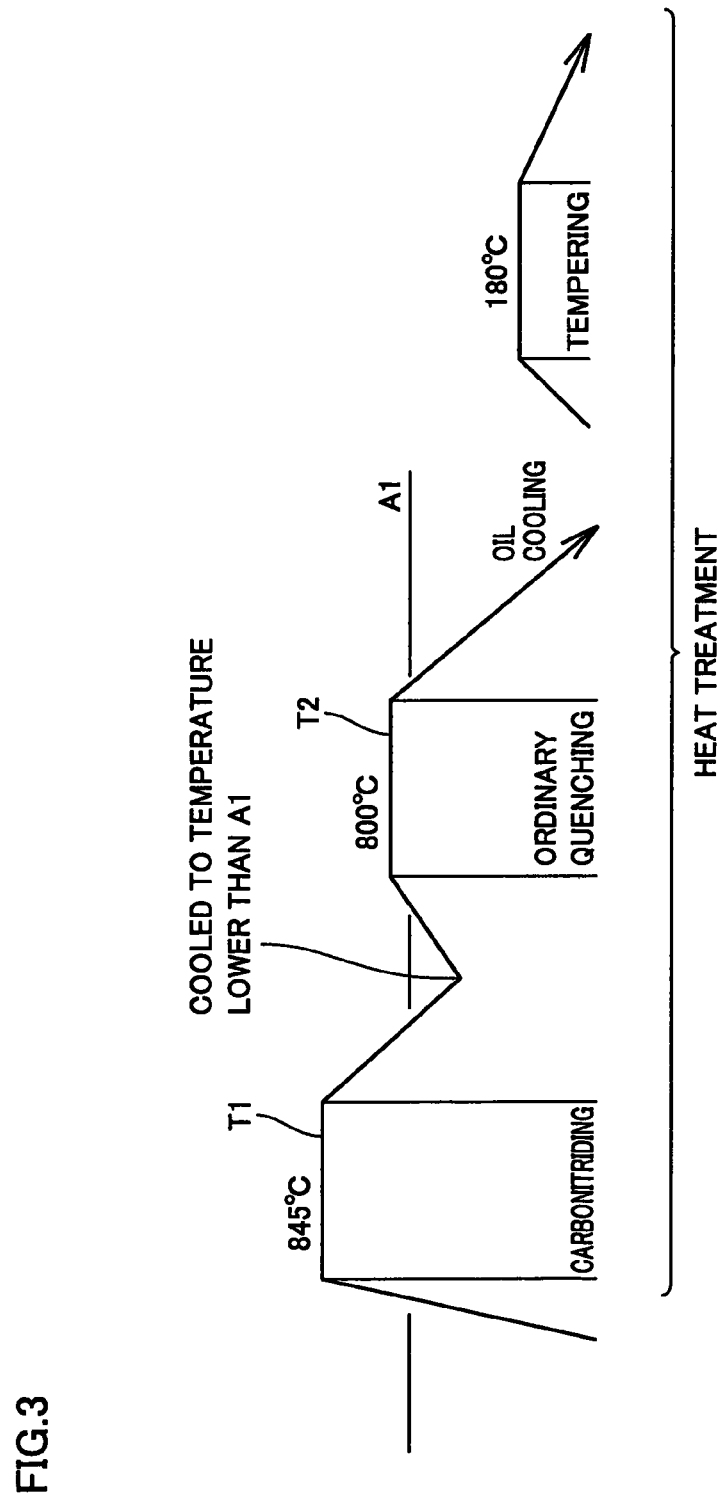
FIG. 3 illustrates a modification of the heat treatment method according to an embodiment of the present invention.

Heat treatment including carbonitriding to be performed on at least one bearing part of the outer ring, inner ring and rolling elements of the rolling bearing is now explained. FIG. 2 illustrates a heat treatment method according to an embodiment of the present invention. FIG. 3 illustrates a modification of the heat treatment method according to an embodiment of the present invention. More specifically, FIG. 2 shows a heat treatment pattern wherein primary quenching and secondary quenching are conducted. FIG. 3 shows a heat treatment pattern wherein a material is cooled to a temperature lower than the $A_1$ transformation temperature in the middle of quenching, and thereafter, the material is reheated to complete the quenching. In FIGS. 2 and 3, in process T1 (heating temperature: $T_1$), carbon and nitrogen are diffused into a matrix of the steel and the carbon is penetrated sufficiently. The steel is then cooled to a temperature lower than the $A_1$ transformation temperature. Next, in process T2 (heating temperature: $T_2$), the steel is reheated to a temperature lower than temperature $T_1$ in process $T_1$, which is followed by oil quenching. From the carbon-iron phase diagram, in the carbonitrided layer, the heating temperature $T_2$ in process T2 falls in a hyper-eutectoid region, which corresponds to a co-existing zone of austenite and precipitates (cementite, nitride or the like).

With the heat treatment described above, compared to the case of ordinary quenching where carbonitriding is followed by one-time quenching, it is possible to improve anti-crack strength and decrease aged dimensional change, while carbonitriding the surface layer portion. As such, according to the heat treatment method as described above, it is possible to obtain the austenite grains which have microstructures with a grain size half or less than the conventional one. The bearing part having undergone the heat treatment described above exhibits a long rolling contact fatigue life, and is improved in anti-crack strength and decreased in aged dimensional change.

Figure 4A:
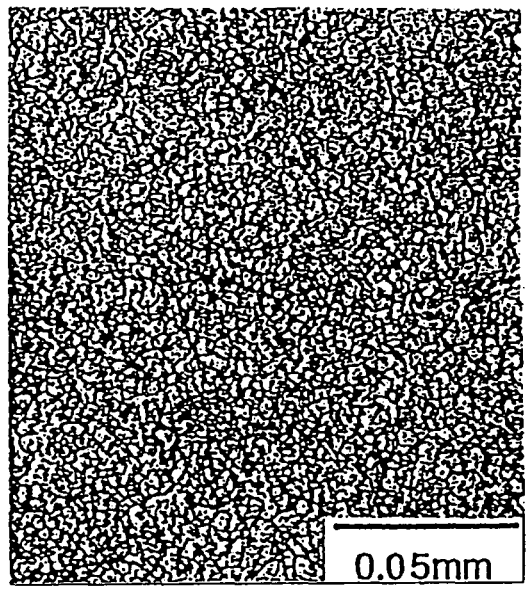
FIGS. 4A and 4B show microstructures, particularly austenite grains, of an inventive bearing part and a conventional bearing part, respectively.
Figure 4B:
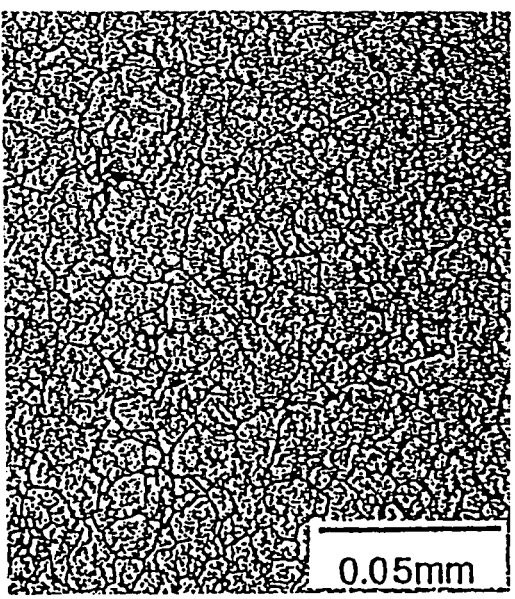
Figure 5A:
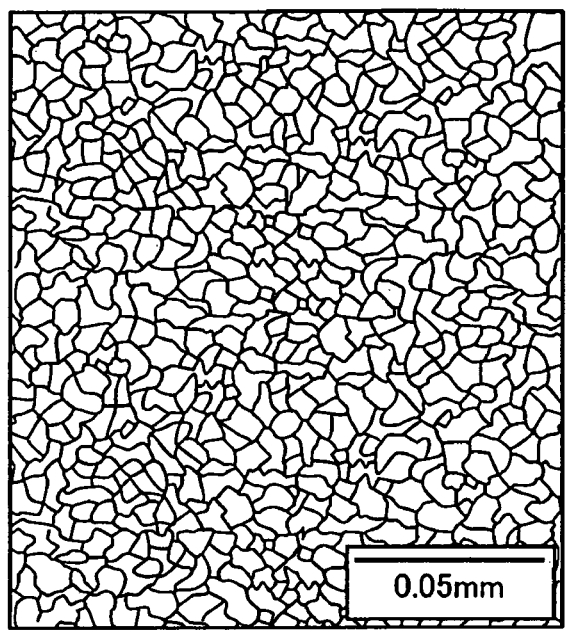
FIGS. 5A and 5B show grain boundaries of the austenite grains shown in FIGS. 4A and 4B, respectively.
Figure 5B:
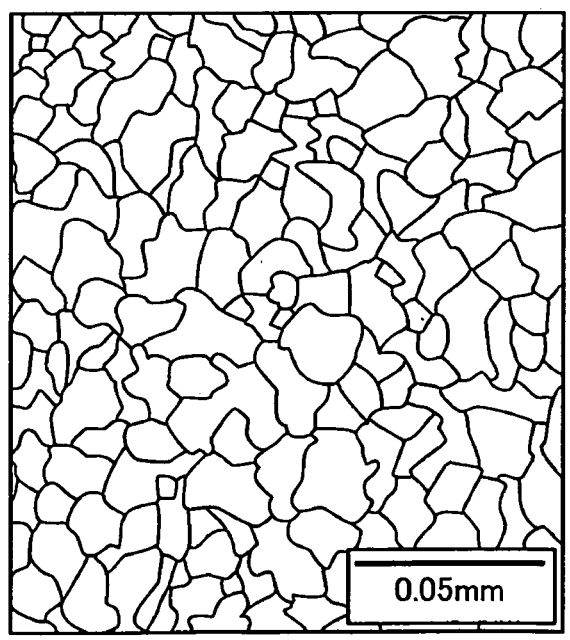

FIGS. 4A and 4B show microstructures, or specifically austenite grains, of the inventive bearing part and a conventional bearing part, respectively. More specifically, the austenite grain size of the bearing steel to which the heat treatment pattern shown in FIG. 2 was applied is shown in FIG. 4A. The austenite grain size of the bearing steel having undergone conventional heat treatment is shown in FIG. 4B for comparison. FIGS. 5A and 5B show grain boundaries of the austenite grains illustrated in FIGS. 4A and 4B, respectively. It is found from these figures showing the austenite grain sizes that, while the conventional austenite grains have a JIS grain size No. 10, finer grains of No. 12 can be obtained by the heat treatment method of the present invention. The grains shown in FIG. 4A have a mean grain size of 5.6 μm measured by the intercept method, with which the mean grain size is obtained from the number of intercepts of a line segment of a predetermined length with grain boundaries.

EXAMPLES

Hereinafter, examples of the present invention are described.

Example 1

In the first example of the present invention, JIS SUJ2 material (including 1.0 wt. % C, 0.25 wt. % Si, 0.4 wt. % Mn, 1.5 wt. % Cr) was employed. Manufacturing histories of the respective samples shown in Table 1 are as follows.

TABLE 1

| Sample | A | B | C | D | E | F | Conventional carbonitrided item | Ordinary quenched item |
|---|---|---|---|---|---|---|---|---|
| Temperature at secondary quenching (° C.) | 780 [1] | 800 | 815 | 830 | 850 | 870 | — | — |
| Hydrogen content (ppm) | — | 0.37 | 0.40 | 0.38 | 0.42 | 0.40 | 0.72 | 0.38 |
| Grain size (JIS) | — | 12 | 11.5 | 11 | 10 | 10 | 10 | 10 |
| Charpy impact (J/cm$^2$) | — | 6.65 | 6.40 | 6.30 | 6.20 | 6.30 | 5.33 | 6.70 |
| Fracture stress (MPa) | — | 2840 | 2780 | 2650 | 2650 | 2700 | 2330 | 2770 |
| Rolling contact fatigue life ratio ($L_{10}$) | — | 5.4 | 4.2 | 3.5 | 2.9 | 2.8 | 3.1 | 1 |

[1] Evaluation was impossible due to insufficient quenching.

Samples A-D (Examples of Present Invention)

Each sample was subjected to carbonitriding at 850° C. and held for 150 minutes. The atmospheric gas was a mixed gas of RX gas and ammonia gas. In the heat treatment pattern shown in FIG. 2, primary quenching was performed from the carbonitriding temperature of 850° C. Secondary quenching was performed by reheating the sample to a temperature lower than the carbonitriding temperature, in a temperature range from 780° C. to 830° C. Sample A reheated to 780° C. for the secondary quenching was eliminated from the test subjects due to insufficient quenching.

Samples E, F (Comparative Examples)

Carbonitriding was conducted with the same history as in samples A-D. Secondary quenching was conducted from a temperature not lower than the carbonitriding temperature of 850° C., in a temperature range from 850° C. to 870° C.

Conventional Carbonitrided Item (Comparative Example)

Carbonitriding was conducted at 850° C. The holding time was 150 minutes. A mixed gas of RX gas and ammonia gas was used as the atmospheric gas. Quenching was conducted from the carbonitriding temperature. Secondary quenching was not conducted.

Ordinary Quenched Item (Comparative Example)

Without subjected to carbonitriding, the item was heated to 850° C. for quenching. Secondary quenching was not conducted.

For the respective samples shown in Table 1, the following tests were conducted: (1) measurement of hydrogen content; (2) measurement of grain size; (3) Charpy impact test; (4) measurement of fracture stress; and (5) rolling contact fatigue test. The testing methods were as follows.

I. Testing Methods in Example 1

(1) Measurement of Hydrogen Content

A hydrogen analyzer DH-103 available from Leco Corporation was used to analyze the non-diffusible hydrogen content within the steel. The diffusible hydrogen content was not measured. The following is the specification of the LECO DH-103 hydrogen analyzer.

Analysis range: 0.01-50.00 ppm
Analysis accuracy: ±0.1 ppm or ±3% H (larger one of them)
Analysis sensitivity: 0.01 ppm
Detection method: from thermal conductivity
Sample weight size: 10 mg to 35 g (maximum: 12 mm in diameter×100 mm in length)
Temperature range of heating furnace: 50-1100° C.
Reagents: Anhydrone (name of merchandise, main ingredient: $Mg(ClO_4)_2$ 92%), Ascarite (name of merchandise, main ingredient: NaOH 80%)
Carrier gas: nitrogen gas, purity of 99.99% or more
Gas-dosing gas: hydrogen gas, purity of 99.99% or more
Pressure: 40 PSI (2.8 kgf/cm$^2$)

The measurement was conducted as follows. A sample taken with and contained in a dedicated sampler was placed in the hydrogen analyzer. The diffusible hydrogen therein was introduced to a thermal conductivity detector by the nitrogen carrier gas. The amount of diffusible hydrogen content was not measured in the present example. Next, the sample was taken out of the sampler, and heated in a resistance heating furnace to guide the non-diffusible hydrogen to the thermal conductivity detector by the nitrogen carrier gas. The thermal conductivity was measured in the thermal conductivity detector to obtain the amount of non-diffusible hydrogen content.

(2) Measurement of Grain Size

The grain size was measured based on the testing method of austenite grain size of steel as defined in JIS G 0551.

(3) Charpy Impact Test

The Charpy impact test was conducted based on the method of Charpy impact test for metallic materials as defined in JIS Z 2242, for which a U-notch test piece (JIS No. 3 test piece) as defined in JIS Z 2202 was used.

(4) Measurement of Fracture Stress

Figure 6:
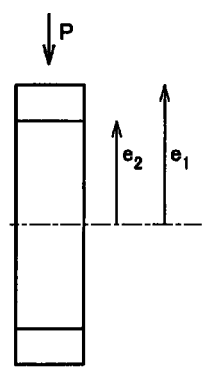
FIG. 6 shows a test piece for a static collapse strength test (for measurement of fracture stress).

FIG. 6 shows a test piece used in the static collapse strength test (for measurement of fracture stress). Load is applied to the test piece in a P direction in FIG. 6 to measure the load required to break the test piece. The breaking load thus obtained is converted to a stress value employing the expression for calculation of stress of curved beam shown below. Not limited to the one shown in FIG. 6, a test piece of any form may be employed for the test.

Of the test piece in FIG. 6, fiber stress Gi on the convex surface and fiber stress $\sigma_2$ on the concave surface are obtained from the following expression (JSME Mechanical Engineers' Handbook, A4: Strength of Materials, A4-40).

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 - e_2/\{\kappa(\rho_0 - e_2)\}]$$

$$\kappa = -(1/A)\int_A \{\eta/(\rho_0 + \eta)\} dA$$

wherein N represents an axial force of the cross section including the axis of the toroidal test piece, A represents a cross sectional area, $e_1$ and $e_2$ represent outer radius and inner radius, respectively, and $\kappa$ represents a section modulus of curved beam.

(5) Rolling Contact Fatigue Test

Figure 7A:
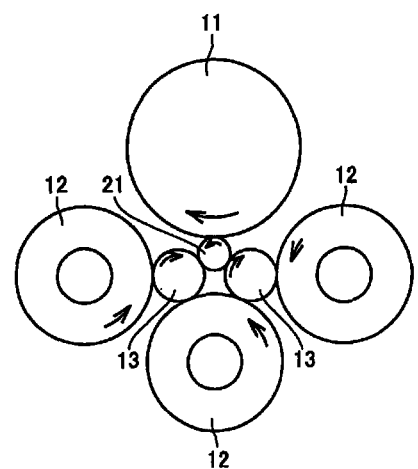
FIGS. 7A and 7B schematically show a rolling contact fatigue test rig in front view and side view, respectively.
Figure 7B:
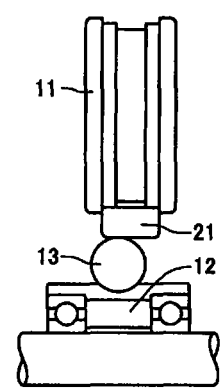

Test conditions of the rolling contact fatigue test are shown in Table 2. FIGS. 7A and 7B schematically show the rolling contact fatigue test rig in front view and in side view, respectively. In FIGS. 7A and 7B, the rolling contact fatigue test piece 21 is driven by a drive roll 11 and rotates in contact with balls 13. Balls 13 of (¾)" are guided by guide rolls 12 and roll exerting a high contact pressure on the test piece 21.

TABLE 2

| | |
|---|---|
| Test piece | φ12 × L22 toroidal test piece |
| Number of test pieces | 10 |
| Counterpart steel balls | ¾" (19.05 mm) |
| Contact pressure | 5.88 GPa |
| Loading rate | 46240 cpm |
| Lubricant oil | Turbine VG68, forced lubricated |

II. Test Results of Example 1

(1) Hydrogen Content

The conventional carbonitrided item having undergone only carbonitriding exhibits very high hydrogen content of 0.72 ppm. This is considered because ammonium ($NH_3$) included in the atmosphere for the carbonitriding decomposed and penetrated into the steel. By comparison, the hydrogen contents of samples B-D are decreased nearly to the half, i.e., 0.37-0.40 ppm, which is at the same level as that of the ordinary quenched item.

Steel embrittlement attributable to dissolved hydrogen can be alleviated by a decrease of the hydrogen content. That is, with the decreased hydrogen contents, samples B-D of the present example exhibit remarkably improved Charpy impact.

(2) Grain Size

In the case where the temperature at secondary quenching is lower than the temperature at carbonitriding (and hence primary quenching), i.e., in the case of samples B-D, extremely fine austenite grains comparable to JIS grain size numbers 11-12 are obtained. The austenite grains of samples E and F, the conventional carbonitrided item and the ordinary quenched item are of JIS grain size number 10, coarser than those of samples B-D of the present example. With the heat treatment according to the above-described embodiment, austenite grains both in the carbonitrided layer and in the inner portion are made finer, attaining almost the same grain sizes with each other. Such a tendency was also found in another example.

(3) Charpy Impact Test

From Table 1, the Charpy impact of the conventional carbonitrided item is 5.33 $J/cm^2$, whereas samples B-D of the present example exhibit high Charpy impact values of 6.30-6.65 $J/cm^2$. Among them, those having undergone the secondary quenching at lower temperatures tend to show the higher Charpy impact values. The ordinary quenched item shows high Charpy impact of 6.70 $J/cm^2$.

(4) Measurement of Fracture Stress

The fracture stress corresponds to anti-crack strength. From Table 1, the conventional carbonitrided item exhibits fracture stress of 2330 MPa. By comparison, the fracture stress values of samples B-F are improved to 2650-2840 MPa. The ordinary quenched item exhibits fracture stress of 2770 MPa, which is at the same level as those of samples B-F. Such improvement in anti-crack strength of samples B-F is apparently owing to the reduced austenite grain size and the decreased hydrogen content.

(5) Rolling Contact Fatigue Test

From Table 1, the ordinary quenched item has the lowest rolling contact fatigue life $L_{10}$, because its surface layer portion has not been carbonitrided. The conventional carbonitrided item has the rolling contact fatigue life 3.1 times longer than that of the ordinary quenched item. Of samples B-F, samples B-D each having undergone the secondary quenching from a temperature lower than the carbonitriding temperature are further improved in rolling contact fatigue life compared to that of the conventional carbonitrided item. Samples E and F, which belong to the present invention as far as the hydrogen content is concerned, each have the rolling contact fatigue life equal to or shorter than that of the conventional carbonitrided item.

In summary, samples B-F of the present example have decreased hydrogen contents, and are improved in Charpy impact and anti-crack strength. However, the rolling contact fatigue life is additionally elongated only in samples B-D having the finer austenite grains comparable to JIS grain size number 11 or greater. Accordingly, among the samples B-F of the present example, samples B-D fall in a preferred scope of the present invention with which the temperature for the secondary quenching is decreased below the carbonitriding temperature to further reduce the grain size.

Example 2

The second example is now explained. A series of tests were performed on materials A, B and C explained below. As a material to be subjected to heat treatment, JIS SUJ2 (including 1.0 wt. % C, 0.25 wt. % Si, 0.4 wt. % Mn, 1.5 wt. % Cr) was employed commonly for A-C materials. Manufacturing histories thereof are as follows.

A material (Comparative Example): Subjected solely to ordinary quenching (unaccompanied by carbonitriding).

B material (Comparative Example): Subjected to quenching after carbonitriding (conventional carbonitriding and quenching). Carbonitriding temperature was 845° C. and the holding time was 150 minutes. The atmospheric gas for the carbonitriding was a mixed gas of RX gas and ammonia gas.

C material (Example of Present Invention): Bearing steel to which the heat treatment pattern shown in FIG. 2 was applied. It was carbonitrided at 845° C. and held for 150 minutes. A mixed gas of RX gas and ammonia gas was used as the carbonitriding atmosphere. The temperature ($T_2$) for final quenching was 800° C.

(1) Rolling Contact Fatigue Life

The test conditions and the test rig for the rolling contact fatigue life test are as described above, shown in Table 2 and FIGS. 7A and 7B. Table 3 shows the test results.

TABLE 3

| Material | Life (number of loading cycles) | | Ratio of $L_{10}$ |
|---|---|---|---|
| | $L_{10}$ (×10$^4$ times) | $L_{10}$ (×10$^4$ times) | |
| A | 8017 | 18648 | 1.0 |
| B | 24656 | 33974 | 3.1 |
| C | 43244 | 69031 | 5.4 |

From Table 3, the B material as a comparative example has the $L_{10}$ life (a lifetime till one of the ten test pieces is broken) that is 3.1 times as long as that of the A material as another comparative example having undergone only the ordinary quenching. It shows that the carbonitriding advantageously elongates the lifetime. By comparison, the C material of the present example has a long life 1.74 times that of the B material and 5.4 times that of the A material. Such improvement is considered mainly because of the finer microstructure thereof.

(2) Charpy Impact Test

The Charpy impact test was conducted using a U-notch test piece according to the method as defined in JIS Z 2242 described above. Table 4 shows the test results.

TABLE 4

| Material | Charpy impact (J/cm$^2$) | Ratio of impact |
|---|---|---|
| A | 6.7 | 1.0 |
| B | 5.3 | 0.8 |
| C | 6.7 | 1.0 |

While the Charpy impact of the B material (comparative example) having undergone carbonitriding was lower than that of the A material (comparative example) having undergone ordinary quenching, the C material showed the Charpy impact comparable to that of the A material.

(3) Static Fracture Toughness Test

Figure 8:
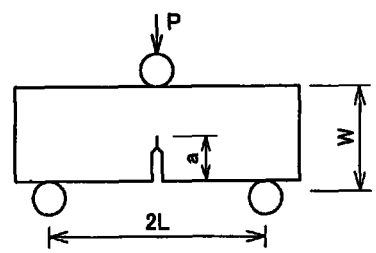
FIG. 8 shows a test piece for a static fracture toughness test.

FIG. 8 shows a test piece used for the static fracture toughness test. The notch portion of the test piece was pre-cracked in a length of about 1 mm, and static load was applied by 3-point bending to obtain a breaking load P. The fracture toughness ($K_{Ic}$ value) was calculated by the following expression (I). The test results are shown in Table 5.

$$K_{Ic} = (PL\sqrt{a}/BW^2)\{5.8 - 9.2(a/W) + 43.6(a/W)^2 - 75.3(a/W)^3 + 77.5(a/W)^4\} \quad (I)$$

TABLE 5

| Material | Number of test pieces | $K_{Ic}$ (MPa$\sqrt{m}$) | Ratio of $K_{Ic}$ |
|---|---|---|---|
| A | 3 | 16.3 | 1.0 |
| B | 3 | 16.1 | 1.0 |
| C | 3 | 18.9 | 1.2 |

The A material and the B material as the comparative examples showed similar fracture toughness, since the pre-cracked depth exceeded the depth of carbonitrided layer. However, the C material of the present example showed the value approximately 1.2 times those of the comparative examples.

(4) Static Collapse Strength Test (Measurement of Fracture Stress)

The test piece as shown in FIG. 6 was used for the static collapse strength test. Load was applied in the P direction in FIG. 6. The test results are shown in Table 6.

TABLE 6

| Material | Number of test pieces | Static collapse strength (kgf) | Ratio of static collapse strength |
|---|---|---|---|
| A | 3 | 4200 | 1.00 |
| B | 3 | 3500 | 0.84 |
| C | 3 | 4300 | 1.03 |

The B material having undergone carbonitriding exhibits a value slightly lower than that of the A material. The C material of the present example has the static collapse strength that is superior to that of the B material and comparable to that of the A material.

(5) Aged Dimensional Change

The materials were held at 130° C. for 500 minutes to measure the aged dimensional changes. Table 7 shows, in addition to the measured results, surface hardness and residual austenite amounts (in depth of 0.1 mm).

TABLE 7

| Material | Number of test pieces | Surface hardness (HRC) | Residual γ amount (%) | Dimensional change (×10$^{-5}$) | Ratio of dimensional change[*] |
|---|---|---|---|---|---|
| A | 3 | 62.5 | 9.0 | 18 | 1.0 |
| B | 3 | 63.6 | 28.0 | 35 | 1.9 |
| C | 3 | 60.0 | 11.3 | 22 | 1.2 |

[*]The smaller is the better.

It is found from Table 7 that the C material of the present example has the dimensional change restricted sufficiently, compared to the B material containing a large amount of residual austenite.

(6) Fatigue Life Test under Foreign Matter Mixed Lubrication

A ball bearing 6206 was employed to evaluate the rolling contact fatigue life under a foreign matter mixed lubrication condition where typical 10 foreign matters were mixed in a prescribed amount. Test conditions are shown in Table 8, and the test results are shown in Table 9.

TABLE 8

| | |
|---|---|
| Load | Fr = 6.86 kN |
| Contact pressure | Pmax = 3.2 GPa |
| Rotational speed | 2000 rpm |
| Lubrication | Turbine 56, dip-feed lubrication |
| Foreign matter content | 0.4 g/1000 cc |
| Foreign matters | particle size: 100–180 μm, hardness: Hv800 |

TABLE 9

| Material | $L_{10}$ life (h) | Ratio of $L_{10}$ |
|---|---|---|
| A | 20.0 | 1.0 |
| B | 50.2 | 2.5 |
| C | 45.8 | 2.3 |

The B material having undergone conventional carbonitriding has the $L_{10}$ life approximately 2.5 times that of the A material. The C material of the present example has the $L_{10}$ life approximately 2.3 times that of the A material. Although the C material of the present example includes the smaller amount of residual austenite than the B material of the comparative example, it has the long life approximately equal to that of the B material by virtue of penetration of nitrogen and finer microstructure therein.

It is found from the above results that the bearing part manufactured by the heat treatment method of the present invention, i.e., the C material of the present example, simultaneously satisfies the three requirements of long life against rolling contact fatigue, improved anti-crack strength and decreased aged dimensional change, which was difficult to realize with the conventional carbonitriding.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A heat treatment method of a bearing part, comprising the steps of:
    carbonitriding steel for a bearing part at a carbonitriding temperature exceeding A1 transformation temperature;
    cooling the steel to a temperature lower than the A1 transformation temperature;
    reheating the steel to a temperature for quenching that is not lower than said A1 transformation temperature but lower than said carbonitriding temperature; and
    quenching the steel, wherein said temperature for quenching is in a temperature range from 790° C. to 815° C., and the steel for the bearing part is JIS SUJ2, thereby providing the steel with austenite grains of a grain size including a JIS grain size greater than number 10 to JIS grain size number 13.

2. The heat treatment method of claim 1, wherein the austenite grains have a grain size exceeding JIS grain size number 11.

3. The heat treatment method of claim 1, further comprising tempering the steel at a temperature of 180° C.

4. The heat treatment method of claim 1, wherein the steel exhibits fracture stress of not less than 2650 MPa.

5. The heat treatment method of claim 1, wherein the steel exhibits a Charpy impact of not less than 6.2 $J/cm^2$.

* * * * *